Nov. 20, 1956   H. S. CAMPBELL   2,771,143
TRANSMISSION SYSTEM FOR ROTATING WING AIRCRAFT
Filed March 29, 1948   3 Sheets-Sheet 1

INVENTOR
Harrie S. Campbell

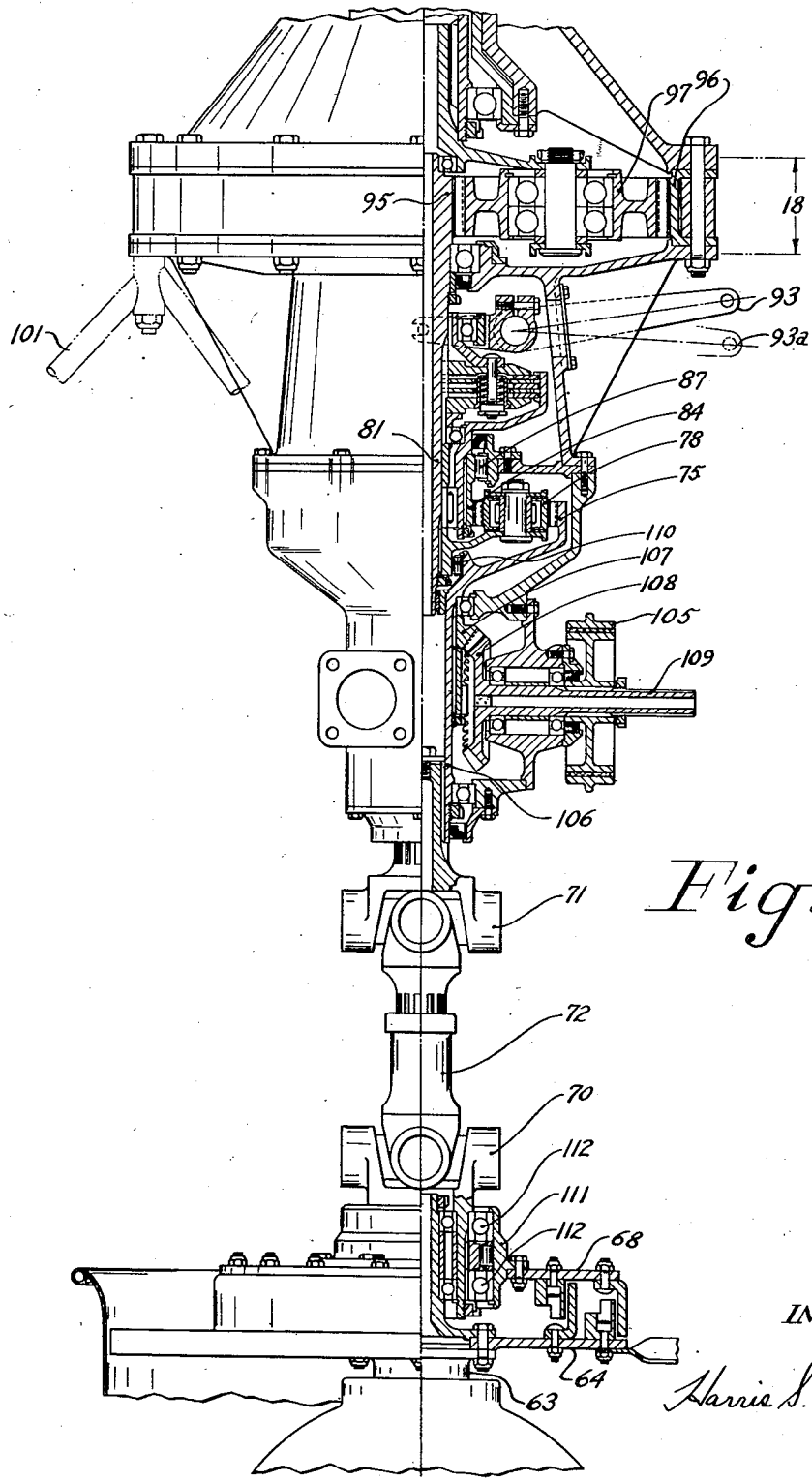

United States Patent Office 2,771,143
Patented Nov. 20, 1956

2,771,143

TRANSMISSION SYSTEM FOR ROTATING WING AIRCRAFT

Harris S. Campbell, Bryn Athyn, Pa.

Application March 29, 1948, Serial No. 17,707

10 Claims. (Cl. 170—135.22)

This invention relates to helicopters and is more particularly concerned with a transmission system between the engine and the rotor capable of providing for a plurality of speed ratios.

In ground vehicles a low gear ratio is required to provide high starting torque under slow speed conditions. In rotary wing aircraft the rotor requirements at slow speed are such that high torque is not required. As the speed of the rotor increases the aerodynamic forces increase and the torque requirements increase as the rotor speed increases to normal operating speeds.

Within the normal operating range of speed there is, however, a need under different conditions of flight operation for different rotor speeds. Under hovering operation where the aircraft is remaining stationary with respect to the ground there is no cross-flow of air over the rotor. Operation under this condition requires the expenditure of greater engine power for sustaining the craft. In order to efficiently use the power available it is desirable to operate during hovering condition at a relatively high angle of attack on the blades to take full advantage of the best power coefficient for the airfoil. With a high angle of attack a slower rotor speed may be used, resulting in lower power required to develop a given amount of lift. This flight condition thus requires that the rotor be operated at a relatively low speed for full power R. P. M. of the engine.

When the helicopter is flying forward at a considerable speed the relative horizontal air-flow across the rotor greatly increases the effectiveness of rotor lift so that the power required to sustain a given load may be reduced. At this forward flight condition the relative air speed is increased on the advancing rotor blade and decreased on the retreating rotor blade. If the rotor blades are operating under this condition at a high angle of attack to produce a high lift coefficient the decrease in relative velocity over the retreating blade will cause the angle of attack at this point to exceed the stalling angle with the result that blade stall occurs throughout a portion of the rotational cycle. Such blade stall results in a momentary high increase in the drag force and loss of lift on each blade as it passes through the retreating position. As a result undesirable vibrations are induced in the rotor and transmitted to the aircraft structure. Also, the efficiency of the rotor is reduced and the engine power cannot be used to full effectiveness.

If the tip speed of the rotor can be increased appreciably for the condition of forward flight the operating angle of attack of the blades may be appreciably reduced so that the tip stall is delayed from occurring until a translational velocity higher than the maximum level flight speed of the aircraft is reached. By providing a transmission system between the engine and the sustaining rotor which is capable of effecting a speed ratio change, it is possible to obtain efficient full power operation of the engine with the rotor at comparatively low speed to give the best lifting capacity for hovering operation. For forward flight operation the speed ratio is changed to provide for increased rotational speed of the rotor for full power R. P. M. of the engine so that full advantage of the engine power can be taken to provide for maximum forward speed and maximum climb.

It is a primary object of the present invention to provide a satisfactory speed change mechanism by means of which the ratio between the engine and rotor may be changed under full power operating conditions. Making this speed change without reduction in power, such as is required in shifting from one gear ratio to another in a normal automobile transmission, is highly desirable to prevent loss of altitude while changing speed. In taking off and landing operations it may often be desirable to shift from one ratio to the other at comparatively low altitudes. Disconnecting the power for even a fraction of a second to make a gear ratio shift would result in an appreciable loss of altitude and would also cause a reduction in speed of the rotor, thus throwing an additional load upon the engine in order to accelerate the rotor to its former velocity.

The present invention provides for a change from a low gear ratio to a high gear ratio by means of a planetary gear set in which there is a ring gear connected to the driving shaft and another gear member which provides the reaction when the transmission is operating in low gear ratio. The reaction for the reaction gear member is preferably provided through a one-way clutch device reacting against the transmission housing. In order to provide for direct drive through the two speed unit when the rotor is being driven in high gear a clutch device locks the reaction gear to the driven shaft thus eliminating the reduction effect of the planetary set. Thus, with the clutch device engaged the two speed unit gears cease to function and direct drive is accomplished through the unit.

In many helicopters having a main lifting rotor a tail rotor is provided for counteracting the torque effects of the main rotor and to permit directional control of the craft. The transmission system between the engine and the rotor is normally arranged with an overrunning or free-wheeling clutch which will allow the rotor to continue rotation under autorotational forces in the event of engine failure. It is desirable that the drive for the tail rotor should be connected to the transmission system so that the tail rotor is driven by the main rotor when the engine power is eliminated. Thus, the tail rotor take-off is between the free-wheeling unit and the main rotor.

When a multiple speed transmission is used the torque developed by the main rotor will be greater when operating in the low speed ratio. As a result, it is desirable that the tail rotor should operate at its maximum speed in order to produce the greatest amount of torque corrective action when the main rotor is operating at slow speed. To provide for this condition the present invention contemplates means for driving the tail rotor at its maximum speed when the rotor is being driven by the engine under its slow speed hovering condition. The take-off for driving the tail rotor is located according to the present invention on the engine side of the multiple speed transmission unit. Since the present invention contemplates the provision of a reactive unit in the multiple transmission of a nature which would prevent reverse torque being transmitted through the multiple speed unit it is essential that means be provided for driving the tail rotor shaft in the event of engine failure. It is an object of the present invention to provide automatic means for assuring positive drive of the tail rotor from the main rotor when engine power is disconnected, such drive being either through the medium of suitable free-wheeling devices or by means of mechanism which engages the multiple speed transmission unit in high gear ratio, thereby permitting the main rotor to drive the tail rotor shaft.

How the foregoing and other objects and advantages of the present invention are accomplished will be clear from the following description of the drawings in which—

Figure 5 is a view similar to Figure 4, but illustrating a different method of coordinating the tail rotor drive with the transmission unit.

Figure 1:
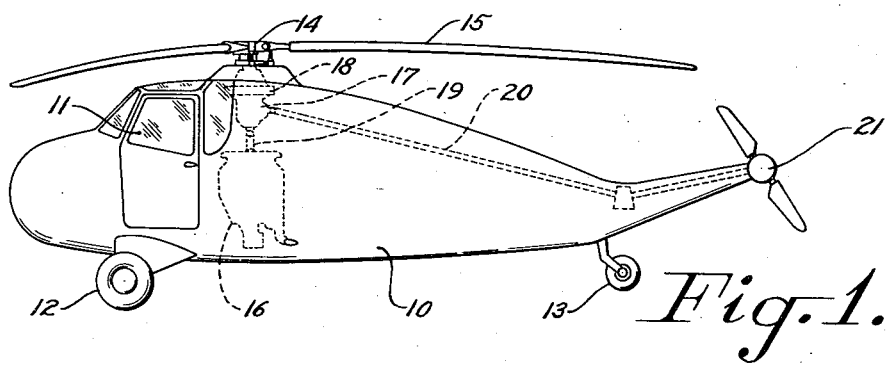
Figure 1 is a side elevational view of an aircraft of the type to which the present invention may be applied.

In Figure 1 there is illustrated a single lifting rotor helicopter having a body 10 with an occupant's compartment at 11 in the forward portion thereof. A landing gear consisting of forward wheels 12 and rear wheel 13 is provided for support of the aircraft on the ground. A sustaining rotor having a rotor hub 14 and rotor blades 15 connected thereto is attached to the fuselage 10. During flight the rotor blades 15 are driven by means of the engine 16 through the medium of transmission units 17 and 18. A shaft 19 connects the engine with the transmission unit and a drive shaft 20 transmits the power from the transmission unit 17 to the tail rotor 21 which is mounted at the rear end of fuselage 10.

Figure 2:
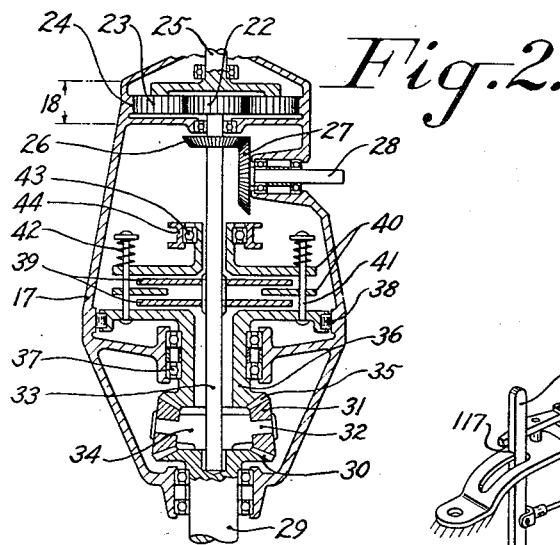
Figure 2 is a somewhat diagrammatic view of transmission mechanism for obtaining two speed ratios in the helicopter drive.

The portion of the transmission unit indicated at 18 houses the main reduction gearing required to provide proper rotational speed for the rotor. A considerable reduction from the engine shaft speed is required, in many instances 10:1 or more reduction being needed, depending upon the size of the rotor. In Figure 2 the main reduction gearing is illustrated as a set of planetary reduction gears housed in the portion of the transmission unit indicated by numeral 18. The planetary set is driven by pinion 22 which drives planet gears 23. The planet gears are also meshed with ring gear indicated at 24 attached to the housing. The rotor shaft 25, being attached to the planetary gears, is driven at low speed. The take-off for the tail rotor shaft is illustrated immediately below the main reduction and is composed of bevel gears 26 and 27 adapted to drive take-off shaft 28 to which the tail rotor shaft 20 is connected.

In order to provide two speed ratios for the rotor drive, additional transmission mechanism is supplied in the portion of the transmission indicated by numeral 17. Here it will be seen that the driving shaft 29 is connected to a bevel ring gear 30. Meshed with bevel gear 30 are a plurality of bevel planet gears 31 which are supported for rotation on an axle 32 which in turn is connected to driven shaft 33 by means of spider structure 34. Another bevel gear 35, which is proportioned according to the reduction desired, is attached to a shaft member 36 supported concentrically to driven shaft 33 by means of bearings 37 supported in the housing.

An overrunning clutch 38 is provided to react between the shaft member 36 and the housing 17 in a fashion to prevent rotation of shaft 36 in a direction opposite to the rotation of input shaft 29. A friction clutch unit is provided having plates 39 splined to driven shaft 33 and plates 40 which are attached to the reaction gear shaft 36. Cylindrical members 41 provide for unitary rotation of plates 40 with shaft 36. Engagement of the clutch occurs by means of compression springs 42 which apply frictional pressure to cause plates 40 to engage with plates 39 so that engagement of the clutch causes shaft 36 to be connected to rotate with driven shaft 33. Since engagement of the clutch causes rotation of shaft 36 in the same direction as shaft 33, such rotation is permitted due to overrunning clutch 38.

Release of the friction clutch is accomplished through thrust bearing 43 and collar 44 by means of which the springs 42 may be compressed to remove the pressure between the plates. A suitable clutch lever (not shown) is provided to engage collar 44.

As will be evident, with the clutch in engaged position the driven shaft 33 is rotated at the same speed as the driving shaft 29. Under this condition of operation the planet gears are inoperative as a reduction medium, and operate merely to provide transmission of 1 to 1 drive between the shafts. With the proportion of planetary gearing indicated, the reduction between shafts 29 and shaft 33 when in low gear ratio will be approximately 1.9 to 1, any desired ratio being obtainable by varying the proportions of gears 30 and 35.

Figure 3:
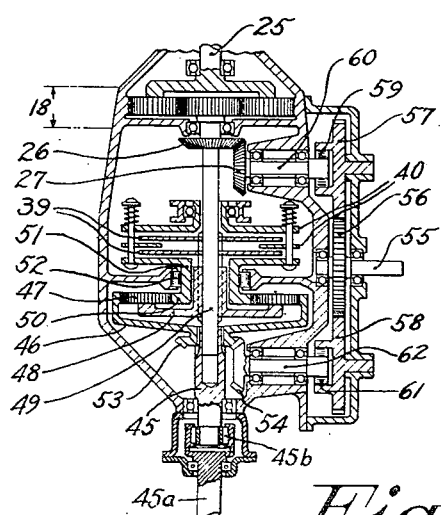
Figure 3 is a diagrammatic view of a somewhat different arrangement illustrating a special method for accommodating the tail rotor drive take-off.

Figure 3 illustrates mechanism in general similar to that shown in Figure 2 including the main transmission gears in the region indicated by numeral 18 and the tail rotor drive bevel gears 26 and 27. Instead of the bevel reduction gears as illustrated in Figure 2, spur planetary gearing is shown in Figure 3. In this instance, the reduction ratio selected is such that suitable proportions of spur planetary gearing may be used. Ratios between approximately 1.25 to 1 and 1.6 to 1 may be obtained by this configuration, the limitations being the practical proportions of the gears. In Figure 3, the input shaft 45 is directly connected to the large ring gear 46 which in turn meshes with planet gears 47 attached to spider or planet carrier 48 which in turn is connected to driven shaft 49. The inner reaction gear 50 is connected to coaxial shaft 51 and is prevented from reverse rotation by the overrunning clutch 52. The friction clutch for causing 1 to 1 operation is similar to that illustrated in Figure 2 and upon engagement causes driven shaft 49 to operate in unison with driving shaft 45.

Besides the bevel gears 26 and 27 which are connected to the driven shaft 49, bevel gears 53 and 54 are connected to the input shaft 45. The tail rotor drive shaft is driven from the shaft 55 which projects from the rear of the casing. Shaft 55 is attached to gear 56 which in turn meshes with gear 57 associated with the upper bevel gears 26 and 27, and also with gear 58 which is associated with the drive from the lower bevel gears 53 and 54. A freewheel device or overrunning clutch 59 is located between the shaft 60 at the upper bevel gear set and the gear 57. A similar freewheel unit 61 provides the driving connection between the shaft 62 of the lower bevel gears and the gear 58. Overrunning devices 59 and 61 are arranged to provide for delivery of torque to the tail rotor when operated in the normal direction of rotation developed by the transmission drive. Thus, when the two speed unit is operating at slow speed the driven shaft 49 is operating at a slower speed than the driving shaft 45. Consequently upper take-off shaft 60 is rotating at a slower speed than lower take-off shaft 62. Under this condition of operation the shaft 62 will be driving the tail rotor through the medium of overrunning clutch 61 and gears 58 and 56. The gear 57 will be operating at a higher speed rotation than the shaft 60, this being permitted by overrunning clutch 59.

In the event of reduction of engine speed to a point where no power is being delivered to the transmission, the main rotor which is connected to shaft 25 continues to rotate under autorotational forces. The existence of overrunning reaction clutch 52 in the two speed transmission prevents reverse drive from the rotor through the two speed transmission. As a result, no torque is delivered to lower bevel gears 53 and 54. Under this condition of operation the tail rotor drive occurs through bevel gears 26 and 27, the overrunning clutch 59 picking up the load and driving the tail rotor shaft 55 through the gears 57 and 56.

In case autorotational operation of the main rotor occurs with the two speed friction clutch engaged, that is, with direct drive between shaft 45 and shaft 49, both sets of bevel gears will be operating at the same speed so that the drive of the tail rotor may be through both sets. It will be evident that in the event of engine failure autorotational operation with the clutch 39, 40 engaged is possible because of the normally provided overrunning clutch 45b in the drive from the engine as shown in the input shaft 45, 45a.

Figure 4:
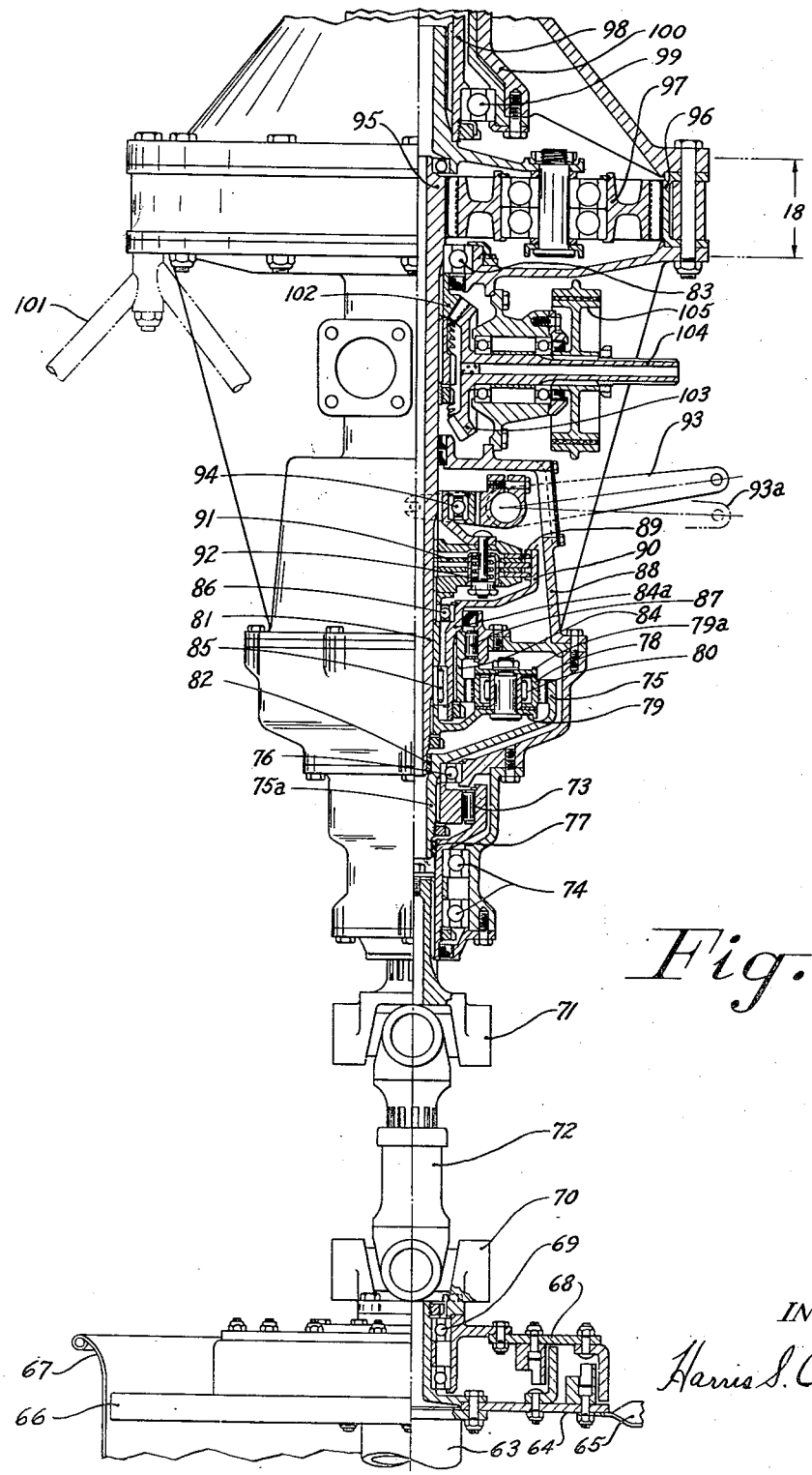
Figure 4 is a view partly in section showing a complete transmission drive from the engine crankshaft to the rotor shaft.

Referring to Figure 4 it will be seen that the complete drive from the engine crankshaft to the rotor axle is illustrated. In this figure the engine shaft is indicated at 63. Connected to the engine shaft is the rotating plate 64 of a centrifugal clutch. Connected to plate 64 are a plurality of fan blades 65 which may have a suitable rim 66 which acts to supplement the flywheel action of plate 64. A housing or cowling 67 is provided to guide the airflow caused by the fan to be directed over the engine cylinders in a suitable fashion to provide for effective cooling action. The driven plate 68 of the clutch is supported by means of suitable bearings 69 and connected to a universal joint 70. The details of the centrifugal clutch need not be herein described. The operation of the clutch is such that engagement occurs automatically as the throttle is opened and the engine reaches a suitable predetermined speed, for example, approximately one-half engine speed. Any other type of clutch may be substituted for the clutch indicated, since the main requirements are that the engine may be connected and disconnected from the transmission under the control of the operator.

The power is transmitted to the transmission unit proper through a second universal joint 71 and a splined driveshaft 72. An overrunning clutch unit 73 is provided in the drive in order to take care of the condition when autorotational operation of the main rotor is used, such as during gliding descent of the helicopter or in the event of engine failure. Bearings 74 support the overrunning clutch 73.

The two speed unit has a ring gear 75 supported in bearings 76 and 77. Ring gear 75 has internal teeth meshing with planet gears 78 which are supported on a spider structure illustrated at 79 and 79a. The rotation of planet gear 78 about its own axis occurs on bearing 80. The spider structure 79 has a splined connection to driven shaft 81 which is supported at the lower end by a bearing 82 located inside driving or input shaft 75a. The upper end of driven shaft 81 is supported by ball bearing 83.

In order to provide for a speed reduction between driving shaft 75a and driven shaft 81, an inner reaction gear 84 is supported on bearings 85 and 86. These bearings are mounted on driven shaft 81. For convenience of manufacture, the gear member 84 is splined to an internal supporting shaft 84a, in effect providing a single shaft. During reduced speed driving, an overrunning clutch unit 87 which reacts between inner gear shaft 84 and the housing 88, retains the inner gear stationary, thus providing for the reduced speed of driven shaft 81.

In the example illustrated, the proportions for the planetary gear set provide for a reduction ratio of about 1.4 to 1. In order to provide for high-speed operation of driveshaft 81, that is, 1 to 1 ratio with driving shaft 75a, a multiple disc clutch is provided having plates 89 splined to shell 90 which is connected with the reaction gear member 84 and plates 91 which are splined to driven shaft 81. Engagement of the clutch is accomplished through the force exerted by a plurality of compression springs 92. A clutch lever 93 provides for the control of the clutch unit. During low speed operation the clutch lever is moved to position 93a, thus compressing springs 92 and relieving the pressure between the clutch plates. The clutch lever 93 in full line position shows the clutch engaged. The thrust bearing 94 provides the means for transferring the disengagement loads from the lever to the clutch. As will be evident, engagement of the clutch provides for the rotation of the complete planetary gearing as an integral unit, thus providing high speed operation for shaft 81 which in turn drives the main planetary reduction gearing located in the portion of the transmission indicated at 18. This reduction gear set consists of the inner or pinion gear 95, a ring gear 96, and planet gears 97 which are connected with the rotating axle 98 of the rotor hub. One end of axle 98 is supported in bearing 99 located in the stationary housing 100. The rotor hub and transmission unit may be supported in the aircraft by bolting at suitable points to structure, one of such points being indicated at 101.

The drive for the auxiliary tail rotor is provided through the medium of bevel gears 102 and 103. Shaft 104 which is driven by gear 103 includes splines to which the tail rotor driveshaft proper may be connected. Brake mechanism such as indicated at 105 may be provided on this shaft for stopping and holding the main rotor while the craft is on the ground.

Figure 5 illustrates a transmission construction generally similar to that shown in Figure 4. There are, however, certain differences in the construction which will be described. In Figure 4, the tail rotor drive is shown located between the two speed unit and the main reduction gearing. In this position, during autorotational operation without engine power, the tail rotor is driven directly through the bevel gears by the main rotor. While this arrangement is satisfactory and provides a comparatively simple mechanism, a rather large tail rotor is needed in order to provide the thrust required for torque counteraction. It will be noted that when the two speed unit is operating in low speed ratio, the tail rotor will also be driven at low speed. It is during this low speed drive of the main rotor that the largest torque is developed, and therefore, the greatest thrust is needed at the tail rotor. With the arrangement in Figure 4, a tail rotor having sufficient size to counteract the torque at slow speed operation must be provided. Such a tail rotor is much over capacity for high speed requirements.

In Figure 5, however, the tail rotor drive take-off unit is located below the two speed transmission unit. Thus during powered operation, the shaft 106 which is driven from shaft 72 and universal joint 71 drives the tail rotor gears 107 and 108. Since these gears are driven directly from the input shaft, the tail rotor take-off shaft 109 is driven at the same speed whether the two speed unit is operating in high speed ratio or in low speed ratio.

During autorotational operation of the main rotor, when the two speed unit is in high speed ratio, that is, with the clutch in engaged position as shown by the full-line position 93 of the clutch lever, the shaft 81 is directly connected to the shaft 106 since the planetary gearing 75, 78 and 84 operates as a unit. However, in case autorotational operation occurs during low speed ratio of the two speed unit, that is, when the clutch is in released position 93a, the inner member of the planetary gear set is prevented from transmitting reversed torque to shaft 106 because the reaction by overrunning clutch 87 can only be transmitted in one direction, namely, the power drive direction. For this condition of operation, another overrunning clutch 110 is provided at the lower end of shaft 81 and arranged to permit engagement with the upper end of shaft 106. This overrunning clutch 110 allows shaft 106 to operate at a faster speed than shaft 81 and thus allows it to drive the shaft 81 at a reduced speed during low speed operation of the two speed unit. However, when reverse torque occurs, such as when shaft 81 is being driven under autorotational forces, or when the rotor brake is applied to stop the rotor, overrunning clutch 110 prevents shaft 106 from slowing down to a speed below that of shaft 81. Therefore, shaft 81 is capable of driving shaft 106 in a suitable fashion to provide drive to the tail rotor shaft 109 during autorotational operation, brake application or other reversed torque condition.

It will be noted that while the centrifugal clutch members 64 and 68 have been illustrated generally similar to that shown in Figure 4, the overrunning clutch which allows the transmission to continue operating in the event that the engine speed is reduced, is located at 111. This overrunning clutch 111 is mounted on suitable bearings 112 between the driven member of the centrifugal clutch and the shank of universal joint 70.

Figure 6:
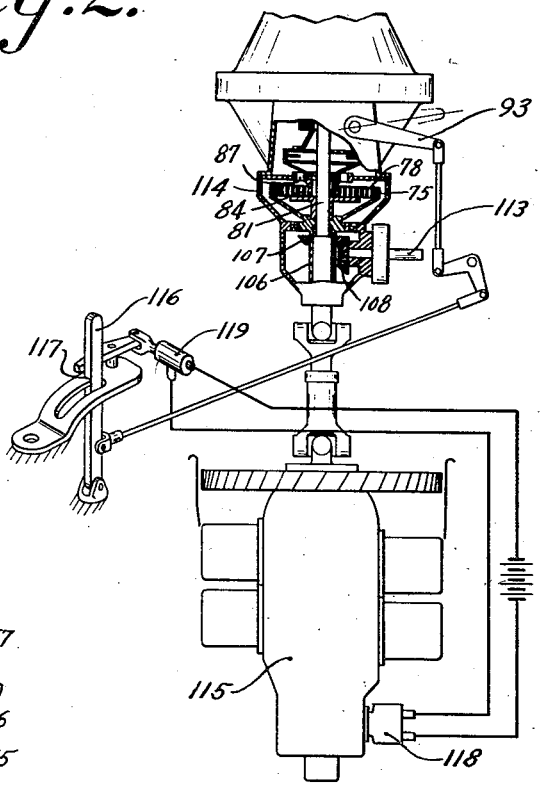
Figure 6 is a diagrammatic view showing an engine and transmission with a governor control for actuation of the two speed unit under certain conditions.

Figure 6 illustrates a transmission system generally similar to that in Figure 5 and having the tail rotor take-off shaft 113 located below the two speed unit 114. The engine 115 provides the power to drive the main rotor and the tail rotor. The clutch lever 93 is shown in disengaged position, that is, with the two speed unit in low ratio operation. To hold the lever 93 in this position, the clutch handle 116 is retained in notch 117. The drive for the tail rotor gearing is the same as that shown in Figure 5 with the exception that the reversed drive overrunning clutch 110 is omitted. It will be noted that the various parts of the transmission illustrated in Figure 6 have been given the same numerals as those of Figure 5. Since the transmission of Figure 6 does not have reverse drive freewheel mechanism, it is necessary to provide some other means for assuring that there will be drive to the tail rotor in the event of loss of engine power. Thus, in case of engine failure during low gear ratio operation, in order to drive the tail rotor shaft 113 from the rotor shaft by autorotational action, it is necessary that the two speed friction clutch be engaged. Automatic means for accomplishing this engagement are provided according to the arrangement in Figure 6. When the engine 115 slows down to a predetermined speed which corresponds to the minimum safe operational condition for the main rotor, the governor 118 attached to the engine acts to provide actuation of solenoid 119 in a fashion to push the handle 116 out of notch 117, thus permitting engagement of the two speed clutch under the influence of the clutch springs. As a result, continued drive of the tail shaft 113 is provided under autorotational operation of the main rotor. In cases where an engine governor is used for control of rotor speed this arrangement provides a simple solution to the auxiliary drive problem.

From the foregoing, it will be evident that I have provided improved mechanism for the operation of helicopter lifting rotors at different speed ratios. The two speed unit of this invention is comparatively simple in nature and provides for rapid change from one driving ratio to another with full power applied and with a minimum of attention from the pilot. Moving a clutch lever from one position to another accomplishes the speed change. This multiple speed mechanism lends itself to ready adaptation to the normal transmission construction used with helicopters. For helicopters having auxiliary rotors, such as antitorque rotors, the provision for drive of the auxiliary rotor at maximum speed during slow speed operation of the main rotor is important. With the type of reduction mechanism of the present invention, means for driving the auxiliary rotor during autorotational operation, have been provided in a comparatively simple fashion.

I claim:

1. A transmission system for a helicopter having a main rotor and an auxiliary rotor including a two speed device having an engine driven input shaft, a freewheeling device in said input shaft to permit rotor operation under aerodynamic forces when engine power is removed, an output shaft from said two speed device a second freewheeling device in said two speed device allowing drive in only one direction when said second freewheeling device is in operation, an auxiliary rotor drive having a connection to said engine driven shaft between said first freewheeling device and said two speed device and a third freewheeling device in said transmission system which is operative to provide drive to said auxiliary rotor drive when the transmission is being operated by aerodynamic forces, said third device being located between said output shaft and said auxiliary rotor drive.

2. A helicopter transmission unit for transmitting power to a main lifting rotor and to an auxiliary rotor, said unit including a two-speed gear reduction having a freewheel device and a slipping clutch for making the gear reduction effective or non-effective, said gear reduction being effective when said slipping clutch is disengaged, an input shaft and an output shaft to said two-speed reduction, a freewheel unit in said input shaft to permit free rotation of the transmission under the aerodynamic action of the main rotor upon elimination of power to the input shaft, a take-off drive for an auxiliary rotor connected to the input shaft closer to the two-speed gear reduction than said freewheel unit, a second freewheel unit reactively connected with said output shaft to provide for the transmission of torque to the auxiliary rotor drive when said first freewheel device is in operation with said slipping clutch disengaged.

3. A construction in accordance with claim 2 in which the take-off drive for the auxiliary rotor incorporates a third freewheel unit.

4. A helicopter transmission for transmitting power from an engine to a main rotor, said transmission including a speed change unit for shifting speed ratios under power operation, an input shaft to said transmission and an output shaft from said speed change unit, an auxiliary take-off shaft mechanically connected to said input shaft, a freewheel device in said speed change unit to permit transmission of torque under power operation of said input shaft, a second freewheel device to transmit torque to said auxiliary output shaft under non-power operation of said input shaft, said second freewheel device being located between said output shaft and said auxiliary take-off shaft.

5. A two speed helicopter transmission system including an engine driven input shaft having a one-way clutch device to allow automatic continued operation of the input shaft with the engine stopped, a planetary gear unit to provide slow speed operation, a manually controlled clutch between two of the gear supporting members of said planetary gear unit to lock out the planetary reduction and provide direct ratio operation, a one-way reaction device connected to one of the planetary gear members to provide power transmission through said gear unit in one direction only when said manual clutch is disengaged, an output shaft from the planetary gear unit, an auxiliary drive power take-off geared to the input shaft of the transmission between the one way clutch device and the planetary gear unit, automatic back drive means from the output shaft of said planetary unit to said auxiliary take-off to provide for transmission of power to it when engine power is removed from said input shaft with the manual clutch disengaged.

6. A helicopter transmission system having a two speed unit, an input shaft thereto, an output shaft therefrom, a freewheel device in said input shaft, a gear reduction mechanism incorporated in said two speed unit, a one way reaction device in the gear reduction mechanism, a tail rotor drive geared to the input shaft between said freewheel device and said gear reduction mechanism and an automatically engageable mechanism located between said output shaft and said tail rotor drive to operate the tail rotor drive when power is removed from said input shaft.

7. A construction in accordance with claim 6 in which the automatically engageable mechanism includes a controllable clutch in said two speed unit having parts operably connected to said input shaft, and a clutch control operable to engage said clutch upon elimination of power to the two speed unit thereby providing operation of the tail rotor drive from the torque supplied through the two speed unit.

8. For a helicopter rotor transmission system, normal drive reduction gearing, additional two-speed reduction gearing located between said normal gearing and the power source, input and output shafts in said two speed reduction, said two speed gearing incorporating an internally toothed ring gear connected to the input shaft, planet gears meshing with said ring gear and connected to the power output shaft, a sun gear meshing with said planet gears and supported on a hollow shaft surrounding said output shaft, a one-way reaction device connected to said hollow shaft, a multiple disc clutch having parts connected to said hollow shaft and parts connected to said output shaft, said clutch being located between said two speed gearing and said normal gearing, said one way reaction device being located between said disc clutch and said two speed reduction gearing, a manual control connected to said multiple disc clutch and a freewheel device in said input shaft.

9. A helicopter having a main lifting rotor and a tail rotor, an engine, a transmission system for directing power to said rotors including a unit having two-speed reduction gearing, an input shaft to said unit having an overrunning device therein, a power take-off shaft for said tail rotor mechanically connected to said input shaft closer to said unit than said overrunning device, an output shaft from the two-speed unit, drive mechanism between the output shaft and said power take-off shaft having a freewheeling device, and freewheeling mechanism connected to said two-speed gearing to provide reaction for drive from the input shaft to the output shaft but which prevents reverse drive through the gearing.

10. A two-speed transmission unit for a helicopter having a driving shaft, a spur planetary gear set capable of producing a speed reduction, a housing, said gear set including a large diameter ring gear having internal teeth attached to said driving shaft, a driven shaft, planet gears rotatably mounted on said driven shaft and meshed with said ring gear, a reaction gear meshed with said planet gears and having directly connected freewheel means reacting directly against said housing, a controllable slipping type clutch having parts connected with said reaction gear and other parts connected with said driven shaft at its output end to cause said driving shaft and said driven shaft to rotate in direct ratio upon engagement of said clutch.

References Cited in the file of this patent
UNITED STATES PATENTS

| Number | Name | Date |
|---|---|---|
| 918,258 | Badois | Apr. 13, 1909 |
| 1,731,548 | Starr | Oct. 15, 1929 |
| 1,839,145 | Forichon | Dec. 29, 1931 |
| 1,861,482 | Sifton | June 7, 1932 |
| 2,013,126 | Bonn | Sept. 3, 1935 |
| 2,189,220 | Osborne | Feb. 6, 1940 |
| 2,202,794 | Hanson | May 28, 1940 |
| 2,225,121 | Lundquist | Dec. 17, 1940 |
| 2,254,334 | Vincent | Sept. 2, 1941 |
| 2,263,304 | Larsen | Nov. 18, 1941 |
| 2,269,916 | Price | Jan. 13, 1942 |
| 2,318,260 | Sikorsky | May 4, 1943 |
| 2,339,967 | Vincent | Jan. 27, 1944 |
| 2,416,662 | Lundquist | Feb. 25, 1947 |
| 2,419,604 | Stanley | Apr. 29, 1947 |
| 2,428,128 | Sheppard | Sept. 30, 1947 |
| 2,456,942 | Holbrook | Dec. 21, 1948 |
| 2,495,988 | Sheppard | Jan. 31, 1950 |
| 2,505,002 | Orr | Apr. 25, 1950 |
| 2,648,386 | Tidd | Aug. 11, 1953 |

FOREIGN PATENTS

| Number | Country | Date |
|---|---|---|
| 15,607 | Australia | Dec. 15, 1933 |
| 432,124 | Great Britain | July 18, 1935 |
| 595,688 | France | July 24, 1925 |

OTHER REFERENCES

Aviation (magazine), November 1944, pages 125–131.